United States Patent
Gutierrez et al.

[11] Patent Number: 6,085,594
[45] Date of Patent: Jul. 11, 2000

[54] HIGH RESOLUTION AND LARGE DYNAMIC RANGE RESONANT PRESSURE SENSOR BASED ON Q-FACTOR MEASUREMENT

[75] Inventors: Roman C. Gutierrez, Glendale; Christopher B. Stell, Valencia; Tony K. Tang, Glendale; Vatche Vorperian, Irvine; Jaroslava Wilcox, Los Angeles; Kirill Shcheglov, Pasadena; William J. Kaiser, Los Angeles, all of Calif.

[73] Assignee: The United States of America as represented by the Administrator of the National Aeronautics and Space Administration, Washington, D.C.

[21] Appl. No.: 09/158,163

[22] Filed: Sep. 4, 1998

[51] Int. Cl.[7] .................................................. G01L 11/00
[52] U.S. Cl. .............................................................. 73/704
[58] Field of Search ............................ 73/702, 704, 714, 73/723, 773, 778, 517 AV; 310/338, 360, 361; 340/58, 224

[56] References Cited

U.S. PATENT DOCUMENTS

| | | |
|---|---|---|
| 3,806,905 | 4/1974 | Strenglein . |
| 4,419,600 | 12/1983 | Sinha . |
| 4,813,271 | 3/1989 | Greenwood . |
| 4,926,143 | 5/1990 | Harada et al. . |
| 5,009,108 | 4/1991 | Harada et al. . |
| 5,089,695 | 2/1992 | Willson et al. . |
| 5,105,665 | 4/1992 | Parsons et al. . |
| 5,142,913 | 9/1992 | Delatorre . |
| 5,195,374 | 3/1993 | Parsons et al. . |
| 5,465,620 | 11/1995 | Sanderson et al. . |
| 5,471,882 | 12/1995 | Wiggins . |
| 5,491,604 | 2/1996 | Nguyen et al. . |
| 5,510,276 | 4/1996 | Diem et al. . |
| 5,591,900 | 1/1997 | Bronowock et al. . |
| 5,594,649 | 1/1997 | Cook et al. . |
| 5,633,471 | 5/1997 | Fukushima . |

OTHER PUBLICATIONS

Randy Frank and Dean Walters—"Industrial Control Reaps Benefits of Micromachined Pressure Sensors", Jan. 1996, pp. 33–36.

M. Dufour, M.T. Delaye, F. Michel, J.S. Daniel, B. Diem and G. Delapierre—"A Comparison Between Micromachined Pressure Sensors Using Quartz or Silicon Vibratng Beams", 1992, pp. 201–209 (No month).

Diogenes Angelidis and Philip Parsons—"Optical Micromachined Pressure Sensor for Aerospace Applications", May 6, 1991, 5 pages.

W.P. Eaton and J.H. Smith—Characterization of a Surface Micromachined Pressure Sensor Array, May 1995, pp. 256–264.

*Primary Examiner*—William Oen
*Attorney, Agent, or Firm*—John H. Kusmiss

[57] ABSTRACT

A pressure sensor has a high degree of accuracy over a wide range of pressures. Using a pressure sensor relying upon resonant oscillations to determine pressure, a driving circuit drives such a pressure sensor at resonance and tracks resonant frequency and amplitude shifts with changes in pressure. Pressure changes affect the Q-factor of the resonating portion of the pressure sensor. Such Q-factor changes are detected by the driving/sensing circuit which in turn tracks the changes in resonant frequency to maintain the pressure sensor at resonance. Changes in the Q-factor are reflected in changes of amplitude of the resonating pressure sensor. In response, upon sensing the changes in the amplitude, the driving circuit changes the force or strength of the electrostatic driving signal to maintain the resonator at constant amplitude. The amplitude of the driving signals become a direct measure of the changes in pressure as the operating characteristics of the resonator give rise to a linear response curve for the amplitude of the driving signal. Pressure change resolution is on the order of $10^{-6}$ torr over a range spanning from 7,600 torr to $10^{-6}$ torr. No temperature compensation for the pressure sensor of the present invention is foreseen. Power requirements for the pressure sensor are generally minimal due to the low-loss mechanical design of the resonating pressure sensor and the simple control electronics.

12 Claims, 2 Drawing Sheets

HIGH RESOLUTION AND LARGE DYNAMIC RANGE RESONANT PRESSURE SENSOR BASED ON Q-FACTOR MEASUREMENT

ORIGIN OF THE INVENTION

The invention described herein was made in the performance of work under a NASA contract, and is subject to the provisions of Public Law 96–517 (35 USC 202) in which the Contractor has elected not to retain title.

BACKGROUND OF THE INVENTION

1. Field of the Invention

This invention relates to pressure measurement and more particularly to a high resolution and large dynamic range pressure sensor that uses oscillator resonance and the associated Q-factor in order to determine such pressure.

2. Description of the Related Art

With increased technical knowledge with respect to material science, machine fabrication, and operating modes, pressure sensors have become increasingly refined. In particular, micromachined quartz or silicon pressure sensors have been the subject of research and industrial use for several years. Such micromachined pressure sensors take generally two forms: diaphragm-based pressure sensor and vibrating beams. Such pressure sensors are often made of either quartz or silicon and a summary of such materials and their characteristics are given in the article M. Dufour et al., *A Comparison Between Micromachined Pressure Sensors Using Quartz or Silicon Vibrating Beams*, Sensors and Actuators A. 34, 1992, 201–209. Other articles and descriptions of the current state of the art describe various aspects and considerations with respect to such micromachined pressure sensors.

As a basis for using such micromachined pressure sensors, changes occur in the operating characteristics of such pressure sensors when subject to varying types and/or amounts of pressure. For some designs, piezoelectric characteristics serve as means by which pressure may be detected. For other designs, change in resonant frequencies due to the presence of pressure serves as the means by which pressure is detected. Such pressure sensors are generally inexpensive, highly reliable, very accurate, and easy to adapt to a variety of tasks in a variety of environments. By expanding the available variety and types of micropressure sensors, greater pressure sensing and associated economic and industrial advantage is achieved.

Any resonator, such as mass on a string, has a natural frequency at which it will preferably oscillate. The degree to which energy can be stored in a resonator in relation to the energy dissipated per half-cycle is related to the quality factor, or Q-factor, of the resonator. With the mass on the string example, Q is equal to the resonant frequency divided by a factor $\gamma$. $\gamma$ is equal to the damping rate which is equal to $\eta$ divided by the mass. $\eta$ represents a viscous damping coefficient representing frictional dissipation. This example with respect to the simple case of the mass on a string can be extended to almost any resonator. The equation is given below $$Q = \omega_0/\gamma = \omega_0 m/\eta$$

By analogy, it can be seen that when pressure upon a micromachine resonator changes, the factor $\eta$ may change as well. Additionally, the natural resonant frequency of the resonator may change. For any particular resonator, these factors are generally known and generally do not change with respect to different, but identically constructed, resonators. Consequently, by evaluating the Q-factor of a resonator, the pressure upon that resonator may be evaluated. For micromachined pressure sensors, such pressure evaluation can be extremely accurate due to the high Q of the resonator coupled with the very low power operating requirements. Prior to the present invention, use of a resonator's Q-factor in a micropressure sensor has not been achieved and/or exploited.

SUMMARY OF THE INVENTION

The present invention provides accurate pressure sensing with a high degree of precision using a small and inexpensive micromachined pressure sensor. The pressure sensor is made of silicon or quartz and is driven by a sensing/driving circuit. Initially, the sensor is electrostatically driven at its mechanical resonance. The drive circuit locks the resonator's motion at a predetermined amplitude and frequency at such mechanical resonance. As pressure upon the sensor changes, the drive circuit tracks frequency drifts in the sensor's resonance and adjusts the drive frequency to match the shifted mechanical resonance frequency. Consequently, the resonator is always driven at resonance.

Pressure changes also create changes in the damping of the resonator, affecting the Q-factor of the resonant mode and the displacement of the resonator as it vibrates. Upon sensing the change in amplitude, the drive circuit automatically varies the electrostatic force to compensate for the deviation. Consequently, the drive signal emitted from the circuit directly indicates the changes in pressure. The low-loss resonator design coupled with its high Q-factor results in high pressure sensitivity from less than $10^{-2}$ to $10^{-6}$ torr. The range of the sensor can be increased to cover as much as 10 atmospheres to less than $10^{-6}$ atmospheres through minor modifications of the drive circuit and resonator design.

The driving circuit returns a linear response over the entire pressure range, making more convenient accommodation and interpretation of the return signal. Additionally, due to the unique resonant mode used for operation, little or no temperature compensation is required. Due to the low-loss mechanical design and simple control electronics, very little power is needed to operate the present invention.

OBJECTS OF THE INVENTION

It is an object of the present invention to provide a sensitive pressure sensor.

It is an additional object of the present invention to provide a sensitive micromachined pressure sensor.

It is yet another object of the present invention to provide a sensitive micromachined pressure sensor that is relatively inexpensive.

It is yet another object of the present invention to provide a micromachined pressure sensor that indicates pressure and changes in pressure by its Q-factor and changes in Q-factor.

It is yet another object of the present invention to provide a drive circuit for a resonant micromachined pressure sensor that both drives the resonator and indicates the state of the resonator's resonance.

These and other objects and advantages of the present invention will be apparent from a review of the following specification and accompanying drawings.

DESCRIPTION OF THE PREFERRED EMBODIMENT(S)

Figure 1:
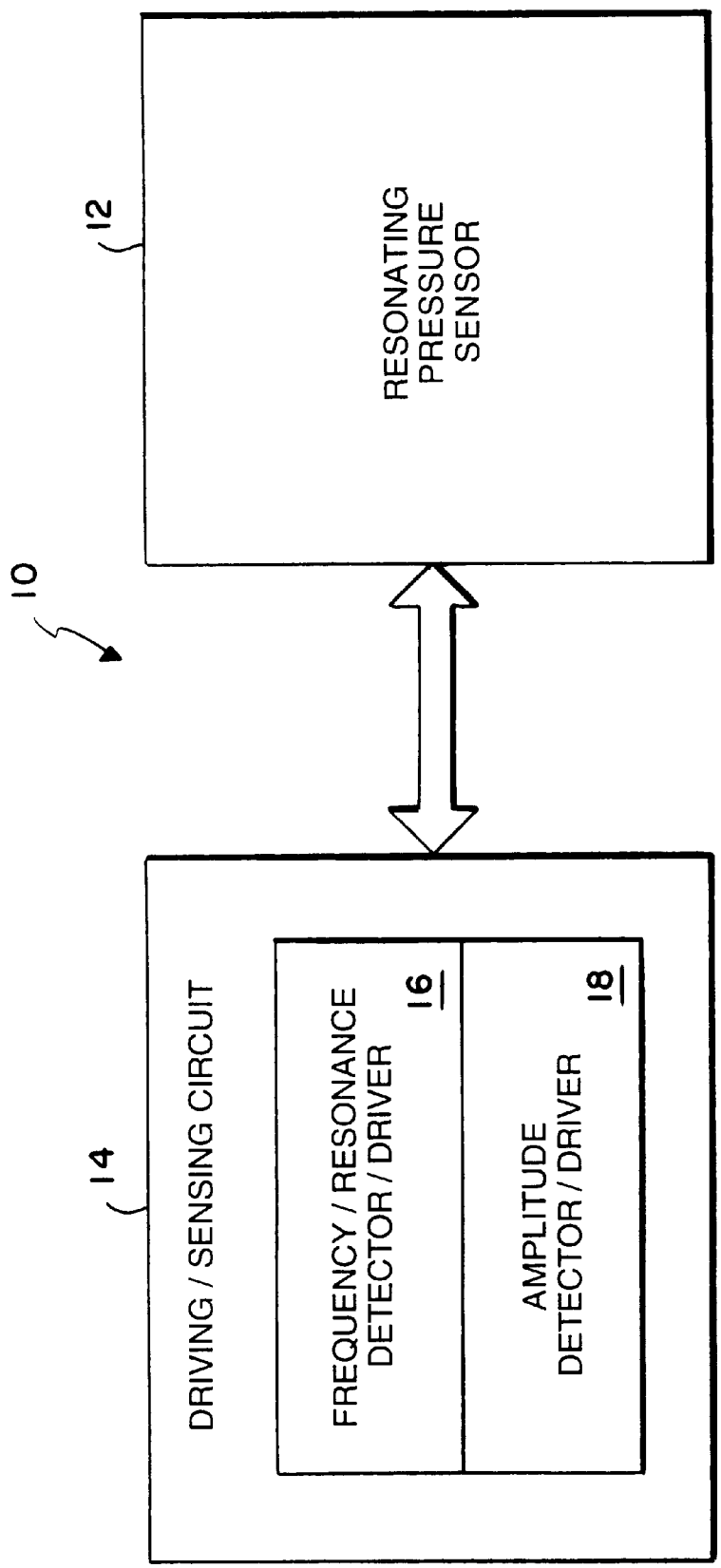
FIG. 1 is a schematic view of the pressure sensor of the present invention showing the resonator and drive circuit.
Figure 2:
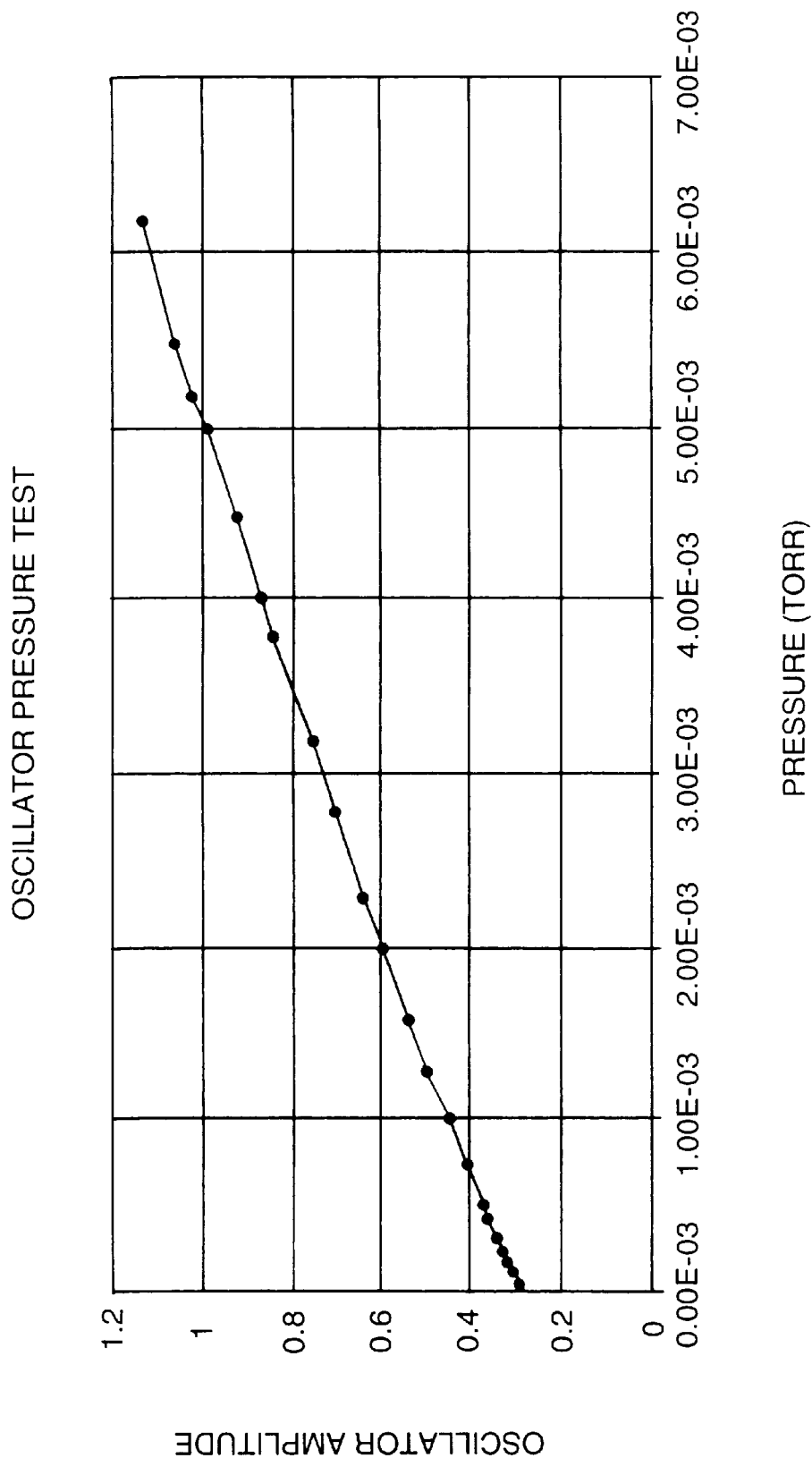
FIG. 2 is a graph of an oscillator pressure test using a version of the present invention.

The present invention provides useful means by which highly-accurate, small and environmentally-tough pressure microsensors can be provided in an economically feasible manner. Commercial applications for the present invention include emissions and engine controls for automobiles, gas pressure monitoring in gas flow processes for manufacturing, pressure switches controlling gas flow, pressure monitoring at various altitudes for weather stations, and the like. Presently, no other pressure sensors are known to be available in the marketplace that have the accuracy or the dynamic range of the present invention. Beyond this, the present invention generally requires no temperature compensation and only minimal power.

Taking advantage of the operating characteristics of micromachined pressure sensors, the present invention uses a special driving circuit that provides a linear indication of changes in pressure. Calibration or comparison to a known standard conveniently supplies indications and measurements of absolute pressure.

In conjunction with a micromachined pressure sensor made either of silicon or quartz, a driving/sensor circuit drives the pressure sensor (or resonator) at resonance. The Q-factors for such resonators are very high although little energy is needed to drive them at resonance. Changes in ambient pressure surrounding the pressure sensor change the pressure sensor's resonance characteristics. These changes in resonance characteristics are reflected in the Q-factor factor as either increased or decreased damping is impressed upon the resonator.

With changes in pressure, changes in the pressure sensor's resonant frequency occur. The driving circuit senses the changes in the resonant frequency and tracks those changes in order to ensure that the resonator is always driven at resonance. Changes in amplitude are compensated by the driving circuit which changes the electrostatic force used to drive the sensor resonance. The increased or decreased force used to drive the pressure sensor/resonator directly indicates changes in pressure. By monitoring the amplitude of the driving signal, the pressure surrounding the pressure sensor is directly monitored.

Micromachined pressure sensors made of silicon or, alternatively, quartz are known in the art and have been the subject of published commercial research for several years. Various types of such micromachined pressure sensors exist in different forms and may rely upon different characteristics in order to indicate pressure changes and/or absolute pressure. One particular form of the micromachined pressure sensor is the resonating pressure sensor often using a beam or other structure driven at resonance. Other driving circuits known in the art use thermal, optical, magnetic, and/or piezoelectric excitation in order to drive the resonating micromachined pressure sensor. In the present invention, electrostatic force is used to drive the resonator at resonance. However, other driving methods may also be used to good advantage and should be considered within the scope of the present invention. Reliance upon Q-factor to directly determine pressure is believed to be heretofore unforeseen in the art.

Micromachined pressure sensors are useful for a variety of reasons. Their small size and generally inert composition allow them to be used in a variety of situations and environments that would exclude larger pressure sensors and/or those that are not able to withstand chemically destructive or other hostile environments. Additionally, such pressure sensors generally have a high Q-factor and are highly sensitive to the driving frequencies impressed upon them. The mechanical designs of such pressure sensors provide generally low loss and correspondingly low energy requirements although a high degree of accuracy over a wide range of pressures is available through the present invention.

A typical micromachined pressure sensor has a vibrating bar or diaphragm that is driven at resonance by a resonant circuit. As mentioned above, when changes in pressure occur ambient to the pressure sensor, the resonance characteristics are altered. These changes can be detected and may be used to provide indications of such pressure changes.

While micromachined pressure sensors are known in the art, means by which the resonance characteristics can be used to determine with great accuracy over a broad pressure spectrum pressure changes and absolute pressure have not been entirely fulfilled. The present invention provides detection of pressure changes as little as $10^{-6}$ torr (approximately $10^{-9}$ atmospheres or $10^{-4}$ pascals). Such accuracy in detection of pressure changes can occur over a wide spectrum of pressures ranging from 7,600 torr (10 atmospheres or approximately $10^6$ pascals) to $10^{-6}$ torr (approximately $10^{-9}$ atmospheres or $10^{-4}$ pascals).

The driving/sensing circuit both drives and senses the pressure sensor/resonator. The driving circuit both drives the pressure sensor at resonance and also detects shifts in resonant frequency. Upon detecting such shifts in the resonant frequency of the pressure sensor, the driving circuit tracks such resonant frequency shifts and alters or modifies the frequency of the driving force to match the resonant frequency of the pressure sensor.

Additionally, the driving circuit also (by necessity) drives the pressure sensor at a certain amplitude or strength of force. The driving circuit detects changes in the amplitude of the pressure sensor and shifts or alters the driving force to maintain the resonating pressure sensor at a specific predetermined amplitude despite shifts in the pressure sensor's resonant frequency.

As mentioned above, the driving circuit uses electrostatic energy to drive the pressure sensor at resonance. The frequency and amplitude of the driving circuit's driving signal are shifted and altered in response to pressure changes to maintain the resonating pressure sensor at resonance and at a fixed or predetermined amplitude.

The high resolution and large dynamic range pressure sensor based on Q-factor measurement of the present invention is achieved by coupling an oscillator/resonator capable of responding to pressure changes (such as a micromachined silicon or quartz pressure sensor) in conjunction with the aforementioned driving/sensing circuit. The driving/sensing circuit is coupled or connected to the pressure sensor in order to both drive the pressure sensor and to detect its responses to such driving signals and impulses.

A preferred mode of operation includes the initial driving of the pressure sensor at resonance by electrostatic forces by the driving circuit. Due to possible response characteristics provided by uniformly constructed micromachined pressure sensors, a benchmark pressure (such as 1 atmosphere at sea level) may be indicated at a known or calibrated frequency and amplitude of the pressure sensor. Upon the initial driving of the pressure sensor at resonance under field conditions, the ambient absolute pressure may be determined by comparison with such a known standard.

In initially driving the pressure sensor at resonance, the driving signals are also generated at a predetermined amplitude. Referring now to FIG. 1, the driver 14 then locks the pressure sensor 12 of the present invention 10 at the initial predetermined electrostatic driving signal amplitude and frequency. So long as the pressure remains constant about the pressure sensor 12, the driving signals generated and transmitted by the driving circuit 14 remain unaltered. Changes in pressure ambient to the pressure sensor affect the resonator and its resonance characteristics. Such resonance response characteristics include changes in the Q-factor as well as changes in the resonant frequency and the amplitude. When such changes occur, the resonant response characteristics of the pressure sensor 12 change and the driving circuit 14 senses such changes. The driving circuit 14 tracks the changes in the resonant frequency and shifts or alters the resonant frequency of the electrostatic driving signal 16 to match that of the pressure sensor 12. Consequently, the pressure sensor 12 is always driven at resonance by the driving circuit 14.

The changes in the Q-factor arising from changes in pressure also affect the amplitude of the oscillations experienced by the pressure sensor 12. The driving circuit 14 senses such changes in amplitude 18. Upon sensing such amplitude changes, the driving circuit alters the force or strength of the resonant frequency signals 18. Such changes in the signal amplitude are such that the amplitude of the resonating pressure sensor 12 are always the same. Consequently, due to the tracking of the resonant frequency by the driving circuit 14 as well as the amplitude detection thereby, the pressure sensor 12 is always driven at resonance and at constant amplitude.

Although the pressure sensor 12 generally maintains its operating characteristics (constant-amplitude resonance), the frequency and amplitude of the driving signals generated and transmitted by the driving circuit 14 change according to the pressure ambient the pressure sensor 12. Due to the operating characteristics of the pressure sensor 12, the amplitude of the signals generated by the driving circuit 14 maintain the pressure sensor 12 at a specific resonant amplitude, linearly reflecting changes in pressure. That is, the pressure and/or pressure changes ambient the pressure sensor 12 are linearly related to the amplitude or strength of the signals generated by the driving circuit 14.

By measuring the amplitude of the driving circuit's signals, a direct indication is given of a pressure and/or pressure changes ambient the pressure sensor 12. Such signals generated by the driving circuit 14 may be transmitted to signal processing equipment to manipulate and/or more easily present the amplitude/pressure data for process monitoring, data gathering, or other purposes.

As mentioned above, relative pressures are easily determined by the present invention 10 due to the resonance response characteristics of the pressure sensor 12. Absolute pressure can be determined either by comparison to a known pressure such as a closed cell adjacent the present invention 10, by calibration of the pressure sensor system 10 of the present invention, or reliance upon known uniform response characteristics.

Due to the unique resonant mode used for operation of the pressure sensor, low sensitivity to temperature changes is expected and, if present, can be easily nulled out. Consequently, no temperature compensation for the pressure sensor of the present invention is needed. Power requirements for the pressure sensor are generally minimal due to the low-loss mechanical design of the resonating pressure sensor and the simple control electronics.

While the present invention has been described with regards to particular embodiments, it is recognized that additional variations of the present invention may be devised without departing from the inventive concept. Measurement and detection of the Q-factor of a resonating pressure sensor provides the present invention means by which pressure changes and/or absolute pressure can be determined to a high degree of accuracy over a wide range of ambient pressures.

What is claimed is:

1. A pressure sensor system, comprising:

a resonating pressure sensor having a Q-factor; and a driving/sensing circuit coupled to said resonating pressure sensor, said driving/sensing circuit detecting and responding to said Q-factor, said driving/sensing circuit transmitting a signal indicative of said Q-factor; whereby pressure changes ambient said resonating pressure sensor are reflected in changes in said signal.

2. The pressure sensor system of claim 1, wherein said resonating pressure sensor further comprises:

a micromachined pressure sensor.

3. The pressure sensor system of claim 2, wherein said micromachined pressure sensor is fabricated from materials selected from the group consisting of silicon and quartz.

4. The pressure sensor system of claim 1, wherein said resonating pressure sensor further comprises:

a resonant beam pressure sensor.

5. The pressure sensor system of claim 1, wherein said driving/sensing circuit always drives said resonating pressure sensor at resonance.

6. The pressure sensor system of claim 1, wherein said driving/sensing circuit always drives said resonating pressure sensor at a constant amplitude.

7. The pressure sensor system of claim 1, wherein said driving/sensing circuit drives said resonating pressure sensor electrostatically.

8. The pressure sensor system of claim 1, wherein said driving/sensing circuit further comprises:

a frequency/resonance detector/driver, said frequency/resonance detector/driver driving said resonating pressure sensor at resonance, detecting shifts in resonance of said resonating pressure sensor, and tracking said shifts so that said resonating pressure sensor is driven at resonance despite pressure changes that shift such resonance; and an amplitude detector/driver, said amplitude/detector driver driving said resonating pressure sensor at a selected amplitude, detecting changes in said amplitude, and adjusting a driving signal driving said resonating pressure sensor to maintain said selected amplitude; whereby an amplitude of said driving signal reflects an amplitude of said resonating pressure sensor and ambient pressure upon said pressure sensor.

9. A pressure sensor system, comprising:

a resonating micromachined pressure sensor having a resonant beam and a Q-factor, said pressure sensor fabricated from materials selected from the group consisting of silicon and quartz; and a driving/sensing circuit coupled to said resonating pressure sensor and electrostatically driving said resonating pressure sensor at resonance and at a selected constant amplitude despite pressure-induced changes in said pressure sensor's resonance and amplitude, said driving/sensing circuit detecting and responding to said Q-factor and transmitting a signal indicative of said Q-factor; whereby pressure changes ambient said resonating pressure sensor are detected by said driving/sensing circuit and reflected in changes in said signal.

10. The pressure sensor system of claim 9, wherein said driving/sensing circuit further comprises:

a frequency/resonance detector/driver, said frequency/resonance detector/driver driving said resonating pressure sensor at resonance, detecting shifts in resonance of said resonating pressure sensor, and tracking said shifts so that said resonating pressure sensor is driven at resonance despite pressure changes that shift such resonance; and an amplitude detector/driver, said amplitude/detector driver driving said resonating pressure sensor at a selected amplitude, detecting changes in said amplitude, and adjusting a driving signal driving said resonating pressure sensor to maintain said selected amplitude.

11. A driving/sensing circuit for a resonating pressure sensor having a Q-factor influenced by changing ambient pressure, said driving/sensing circuit comprising:

a frequency/resonance detector/driver, said frequency/resonance detector/driver driving the resonating pressure sensor at resonance, detecting shifts in resonance of the resonating pressure sensor, and tracking said shifts so that the resonating pressure sensor is driven at resonance despite pressure changes that shift such resonance; and an amplitude detector/driver, said amplitude/detector driver driving the resonating pressure sensor at a selected amplitude at said resonance, detecting changes in said amplitude, and adjusting a driving signal driving the resonating pressure sensor to maintain said selected amplitude.

12. The driving/sensing circuit for a resonating pressure sensor having a Q-factor influenced by changing ambient pressure as set forth in claim 11, wherein said driving/sensing circuit drives said resonating pressure sensor electrostatically.

* * * * *